United States Patent
Spinella

(10) Patent No.: US 9,797,443 B2
(45) Date of Patent: Oct. 24, 2017

(54) ELASTIC BUSHING

(71) Applicant: SAV SRL, Ciserano (IT)

(72) Inventor: Giuseppe Spinella, Azzano San Paolo (IT)

(73) Assignee: SAV SRL, Ciserano (IT)

( * ) Notice: Subject to any disclaimer, the term of this patent is extended or adjusted under 35 U.S.C. 154(b) by 0 days.

(21) Appl. No.: 14/786,665

(22) PCT Filed: Apr. 28, 2014

(86) PCT No.: PCT/IT2014/000115
§ 371 (c)(1),
(2) Date: Oct. 23, 2015

(87) PCT Pub. No.: WO2014/178088
PCT Pub. Date: Nov. 6, 2014

(65) Prior Publication Data
US 2016/0084302 A1 Mar. 24, 2016

(30) Foreign Application Priority Data

Apr. 30, 2013 (IT) .............................. CR2013A0013

(51) Int. Cl.
B60G 11/22 (2006.01)
F16C 27/06 (2006.01)
(Continued)

(52) U.S. Cl.
CPC ............ *F16C 27/063* (2013.01); *F16C 35/02* (2013.01); *F16F 1/3828* (2013.01); *F16F 1/3842* (2013.01); *F16C 17/10* (2013.01)

(58) Field of Classification Search
CPC ... B60G 11/22; B60G 7/02; B60G 7/00; F16F 1/44; F16F 1/371; F16F 1/3828;
(Continued)

(56) References Cited

U.S. PATENT DOCUMENTS 3,171,699 A * 3/1965 Maxey .................. F16C 27/063
384/222
3,424,503 A * 1/1969 Schulz .................. F16C 27/063
384/222
(Continued)

FOREIGN PATENT DOCUMENTS

DE 10 2008 049747 A1 4/2010
EP 0 420 381 A2 4/1991
(Continued)

OTHER PUBLICATIONS

International Search Report, dated Aug. 22, 2014, from corresponding PCT application.

Primary Examiner — Pamela Rodriguez
(74) Attorney, Agent, or Firm — Young & Thompson

(57) ABSTRACT

An elastic bushing (1), particularly for use in the goods transport vehicle sector includes: a cylindrical tubular element (2) made of self-lubricating material, and an intermediate ring (3) made of an elastically deformable material, wherein the tubular element (2) and the intermediate ring (3), at one end (2', 3') thereof, are respectively provided with stop collars (4, 5). The elastic bushing (1) further includes an outer ring (6) made of plastic material adapted to deform, on assembly, to allow the bushing (1) to be forced into a respective assembly seat (100), wherein the outer ring (6) has along its side wall a reinforced annular section (16) and at least one gradual coupling surface (26) between the reinforced annular section (16) and the end (6") of the outer ring opposite the stop collars (4, 5).

5 Claims, 2 Drawing Sheets

(51) Int. Cl.
*F16F 1/38* (2006.01)
*F16C 35/02* (2006.01)
*F16C 17/10* (2006.01)

(58) Field of Classification Search
CPC ....... F16F 1/3842; F16C 27/063; F16C 35/02; F16C 17/10
USPC .......... 267/293, 292, 140.11, 141.1, 267/141.3–141.5; 384/222, 125, 202, 384/215, 220, 221, 286, 291
See application file for complete search history.

(56) References Cited

U.S. PATENT DOCUMENTS

| | | | | |
|---|---|---|---|---|
| 4,744,677 A | * | 5/1988 | Tanaka | F16F 1/371 267/141 |
| 4,878,767 A | * | 11/1989 | Halder | B60G 7/02 277/402 |
| 5,286,014 A | * | 2/1994 | Chakko | B60G 7/00 267/141.2 |
| 6,364,298 B1 | * | 4/2002 | Vossel | F16F 13/14 267/140.12 |
| 2005/0056983 A1 | * | 3/2005 | Spinella | F16C 27/063 267/293 |
| 2008/0277847 A1 | | 11/2008 | Missig | |
| 2011/0262064 A1 | | 10/2011 | Burgeff et al. | |

FOREIGN PATENT DOCUMENTS

| | | |
|---|---|---|
| FR | 2173397 A * | 10/1973 |
| WO | 02/073052 A1 | 9/2002 |
| WO | 2007/042934 A1 | 4/2007 |

\* cited by examiner

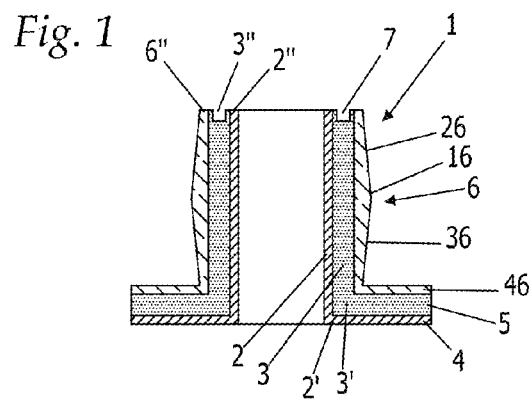
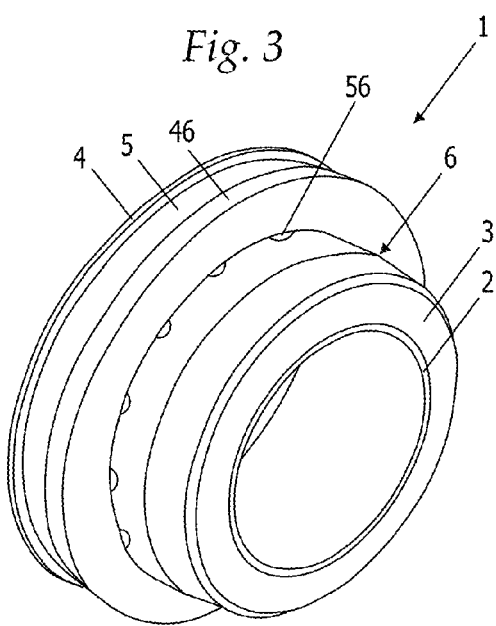
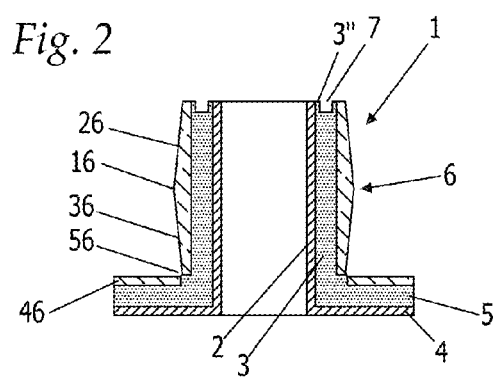
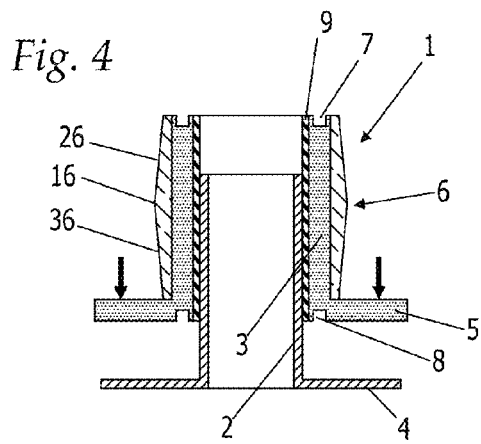
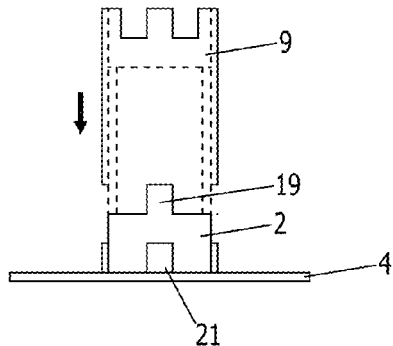
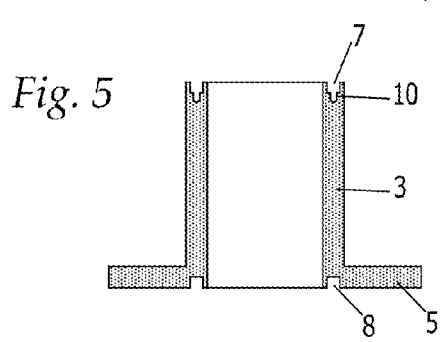
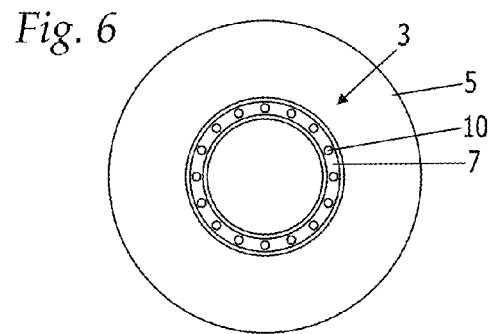

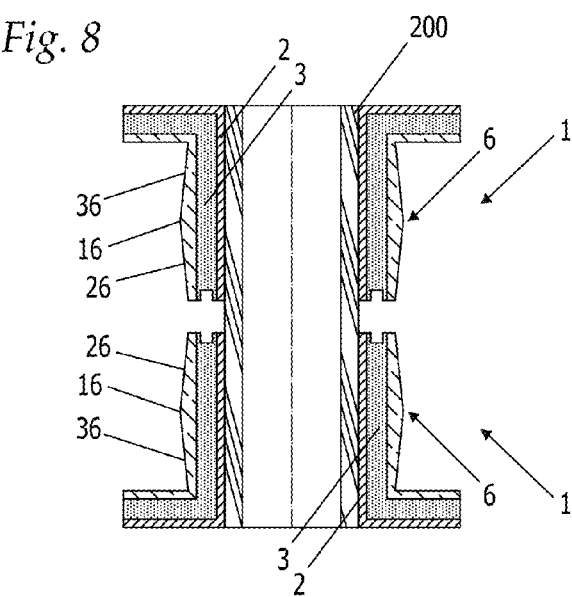
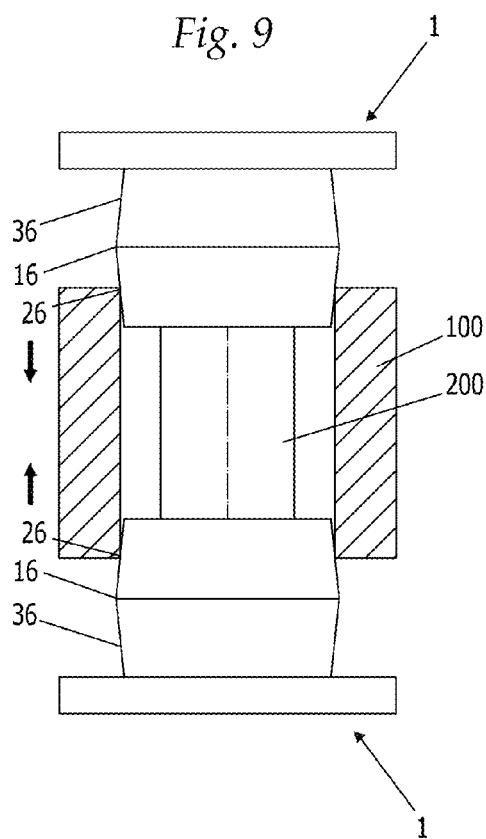
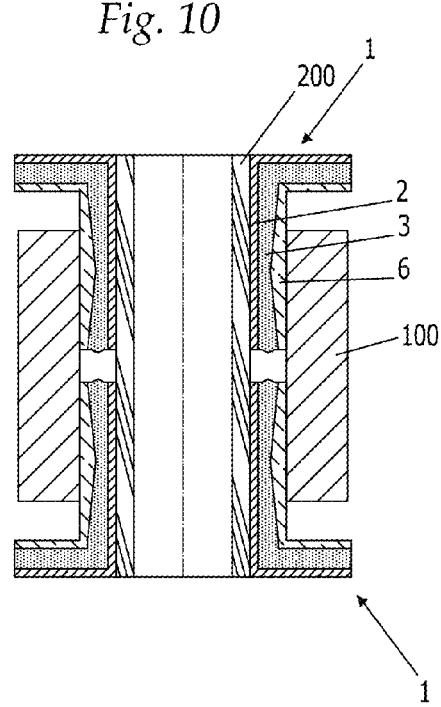

ELASTIC BUSHING

BACKGROUND OF THE INVENTION

The present invention relates to an elastic bushing, particularly for use in the goods transport vehicle sector.

More specifically, the invention relates to elastic bushings that are used to connect an axle or a pin, which is subject to rotations and/or vibrations, to a frame or support. A typical example is represented by the anchoring of the eye of a leaf spring used in shock absorbers to the chassis of commercial vehicles, vans, trucks, etc.

Bushings are known, for example, that essentially comprise an inner cylindrical tubular element made of metal, onto which a rubber elastic ring is vulcanized, which in turn is fixed by means of vulcanization or by interference to an outer cylindrical tubular element, made of metal and coaxial to the first one.

In this case, assembly of the bushings is achieved by coupling by interference the outer metallic cylindrical tubular element to the assembly seat, after boring the latter.

This construction solution has a high risk of torsional fatigue failure of the rubber ring with a consequent reduction in the lifetime of the bushing.

Furthermore, bushings constructed in this manner do not eliminate the inconveniences linked to the need to prepare seats suitable for the assembly by interference of the outer metal tubular element, with consequent high costs due to the mechanical working, to the difficulty of said assembly, and to the high weight and cost of said bushings.

From utility model application no. CR97U000005 by the same applicant, a particular type of bushing is known, essentially comprising an inner cylindrical tubular element made of self-lubricating material, onto which a ring made of rubber or another elastically deformable material is fitted; the outer cylindrical surface of said ring is provided with ribs arranged longitudinally, substantially parallel to the axis of the bushing.

These ribs enable connection by friction by means of the forced fitting of the bushing into the circular seat provided on the element to be connected, without the need for overly precise working of the seat and without having to apply excessive force for assembly.

The pin is free to rotate on the inner surface of the element made of self-lubricating material, and consequently does not transmit any torsional stress to the rubber ring, whose job is therefore only to absorb thrusts and stresses in a radial direction.

However, this type of bushing, although not requiring precise mechanical working and restrictive dimensional tolerances, does have certain limits that are manifested during assembly of the bushings into their respective seats.

These ribs project considerably from the side surface of the rubber ring, constituting a notable radial size and, moreover, extending constantly beyond the dimension of the seat into which the bushing has to be inserted: the operation to insert the bushing into the assembly seat is therefore difficult and requires the use of lubricants to facilitate sliding of the parts, thereby slowing down the assembly operations.

Since these ribs are of the discrete type, they result in discontinuous adherence between the side surface of the rubber ring and the inner wall of the assembly seat.

A further inconvenience consists in the fact that, due to the high assembly force required, the rubber ring is subject to considerable deformations, which may result in expansion and stretching of the rubber, and which could even break the collar of the cylindrical tubular element made of self-lubricating material, thereby requiring the replacement of the bushing.

Furthermore, if the elastic ring in deformable material were freely fitted onto the self-lubricating element and high radial loads were reached during bushing operation, the cylindrical tubular element could rotate with respect to the ring made of deformable material, causing noise and no longer correctly absorbing the thrusts and radial stresses.

SUMMARY OF THE INVENTION

The aim of the present invention is to eliminate the above-mentioned inconveniences, and thereby reduce the time needed for assembly, improve the performance of the bushing during operation, and speed up and reduce the cost of all assembly operations, thereby guaranteeing greater reliability for the connection over time.

Another aim of the invention is to provide a bushing suitable for working with medium/high loads, enabling the elastic material to deform without causing compression or breakage of the collar of the cylindrical tubular element.

A further aim of the invention is to provide a system that, using two bushings, can enable a connection to be made between an oscillating member and a fixed member that is particularly quick to assemble and resistant to wear.

These aims are achieved with an improved elastic bushing comprising:

a cylindrical tubular element made of self-lubricating material, an intermediate ring made of an elastically deformable material, wherein said tubular element and said intermediate ring, at one end thereof, are respectively provided with stop collars, characterized in that it further comprises an outer ring made of plastic material adapted to deform, on assembly, to allow the bushing to be forced into a respective assembly seat, wherein said outer ring has along its side wall a reinforced annular section and at least one gradual coupling surface between said reinforced annular section and the end of said outer ring opposite said stop collars.

According to a first embodiment of the invention, said outer ring has along its side wall a second gradual coupling surface between said reinforced annular section and the end of said outer ring facing said stop collars.

Alternatively, said gradual coupling surfaces may be flat or convex.

According to a further aspect of the invention, said outer ring, at one end, is provided with a stop collar.

Advantageously, said outer ring is made of nylon.

According to a first variant of the invention, said cylindrical tubular element is fixed to said intermediate ring by means of vulcanization.

Furthermore, said intermediate ring comprises a groove made along the edge of the end opposite said stop collars.

Even more advantageously, said outer ring comprises a plurality of openings provided along the line connecting it to its stop collar.

According to a further preferred embodiment of the invention, said intermediate ring is freely fitted onto said cylindrical tubular element and interposed between these there is a reinforcing annular insert made of material that does not yield radially, onto which said intermediate ring is fitted by means of vulcanization.

Advantageously, said intermediate ring comprises two annular grooves respectively obtained therefrom along the edges of its ends.

According to further advantageous embodiments of the invention, said intermediate ring may comprise a plurality of dead holes provided along the groove obtained along the edge of the end thereof opposite said stop collars, and/or a plurality of openings provided along the line connecting it with its stop collar.

In a particularly preferred embodiment of the invention, said reinforcing annular insert, along its inner surface, may comprise a plurality of slots and said cylindrical tubular element comprises corresponding teeth adapted to cooperate with said slots so as to avoid mutual rotation.

Another object of the invention is a connecting system between an oscillating member and a member fixed by means of a pin, wherein said oscillating member comprises a circular assembly seat, inside which there are arranged, mounted on said pin, two bushings as described above.

The improved elastic bushing according to the invention has numerous advantages.

The main advantage derives from the shape of the plastic outer ring, and particularly from the gradual coupling surfaces, which facilitate the insertion of the bushing into the respective assembly seat, without the need for lubricants, and thereby speeding up the entire operation.

Even more advantageously, the reinforced annular portion obtained on the side wall of the plastic ring is shaped so as to increase the diameter of the bushing, which performs effective assembly interference, thereby providing optimal resistance to accidental slipping of the bushing from its seat.

It should also be noted that assembly is achieved by means of force-fitting between a surface made of a plastic material and one made of metal, represented respectively by the side wall of the outer ring and the inner wall of the assembly seat (for example the eye of a leaf spring). This assembly does not require the same dimensional and surface precision as that which would be required when forcing two metal surfaces, and therefore working costs are lower.

During assembly, the deformability of the plastic outer ring also enables pre-compression of the intermediate ring, without the costly drawing which is required for known types of metal bushings.

The stop collar, realized at the end of said outer ring, acts as reinforcement for the stop collar of the tubular element made of self-lubricating material which, in the event that high axial loads were reached during assembly or use, would otherwise tend to break.

The annular grooves and holes in the intermediate ring advantageously create free spaces adapted to be filled with the same material as the deformed elastic ring subject to compression.

The same function is performed by the discrete openings on the outer ring, adapted to be filled by the compressed elastic material of the intermediate ring.

In the embodiment of the invention where the intermediate ring is freely fitted onto the cylindrical tubular element, in order to avoid mutual rotation between the parts and consequent noise, centering and blocking means are provided in the form of slots and corresponding teeth, provided respectively on said intermediate ring and on said tubular element, on which said intermediate ring, adapted to increase the bushing's resistance to radial compression and torsion, can be fixed by means of vulcanization.

In the same embodiment, the presence of a reinforcing annular insert made of material that does not yield radially, interposed between said intermediate ring and said tubular element, is also advantageous.

Even more advantageous is the choice of materials used: in particular, the outer ring may be made of nylon, a light yet resistant material, which can reduce the cost and weight of the bushing. This reduction in weight can be a considerable advantage especially for a commercial vehicle, which has several bushings of this type.

BRIEF DESCRIPTION OF THE DRAWINGS

The advantages of the invention will become more apparent from the following indicative and non-limiting descriptions of preferred embodiments of the invention, illustrated in the accompanying figures, wherein:

FIG. 1 shows a longitudinal section of an elastic bushing according to a first embodiment of the invention;

FIGS. 2-3 show respectively a longitudinal section and an axonometric view of an elastic bushing according to further embodiments;

FIG. 4 shows a longitudinal section of an elastic bushing in a particularly advantageous embodiment;

FIGS. 5 and 6 show respectively a longitudinal section and a top plan view of a component of the bushing according to the invention, in a preferred embodiment;

FIG. 7 shows a side view of two components of an elastic bushing in a particularly advantageous embodiment;

FIG. 8 shows a longitudinal section of two bushings mounted on a pin and ready to create a connecting system according to the invention;

FIGS. 9 and 10 show respectively a partial cross section side view and a longitudinal section of the bushings illustrated in FIG. 8, prior to assembly and after being forced into the eye of a leaf spring.

DETAILED DESCRIPTION OF THE INVENTION

With reference to all the embodiments, the improved elastic bushing 1 essentially comprises an inner cylindrical tubular element 2 and an intermediate ring 3 made of an elastically deformable material.

The cylindrical tubular element 2 is advantageously made of a known type of self-lubricating material, so as to permit the free rotation of the fixing pin 200, onto which the bushings 1 will be fitted, with respect to the intermediate ring 2, without the need for lubricants and without transmission of tangential forces.

Said intermediate ring 3 is advantageously made of rubber or another elastomer material, so as to absorb any radial forces, being deformed in the process, and thereby avoiding the rigid transmission of stresses through the bushing.

The cylindrical tubular element 2 and the intermediate ring 3, at one end, are respectively provided with stop collars 4 and 5, adapted to allow the bushing 1 to withstand compression stresses acting parallel to its longitudinal axis.

Said bushing 1 further comprises an outer ring 6 made of plastic material integral with said intermediate ring 3.

Said outer ring 6 is adapted to deform, on assembly, to allow the bushing 1 to be forced into the respective assembly seat 100, and to pre-compress the elastic intermediate ring 3.

Said outer ring 6 is preferably made of nylon.

As is evident from the Figures, said outer ring 6 has along its outer side wall a reinforced annular section 16, between two gradual coupling surfaces 26, 36 with its ends 6", 6'.

Around the reinforced annular section 16, the overall diameter of the bushing 1 is greater than the internal diameter of the assembly seat 100: this larger diameter enables the bushing 1 to be forced into the assembly seat 100, thus increasing its resistance to slippage.

Said gradual coupling surfaces 26, 36 can alternatively be flat or convex, and in any case they act as a guide for the insertion of the bushing 1 into the respective assembly seat 100, avoiding the use of any lubricant.

In possible embodiments of the invention, said reinforced section 16 may take up not only the middle portion, but also most of the axial dimension of the outer ring 6, extending to the end 6' facing the stop collars 4, 5 of the tubular element 2 and of the intermediate ring 3. In this case, the outer ring 6 will comprise only one gradual coupling surface 26 turned in the direction opposite said stop collars 4, 5.

Said outer ring 6, at one end 6' thereof, may also be provided with a stop collar 46 that overlaps the stop collars 4, 5 of the tubular element 2 and of the intermediate ring 3, cooperating therewith for greater resistance.

In the embodiments shown in FIGS. 1-3, the elastic intermediate ring 3 is vulcanized onto the cylindrical tubular element 2: the bushing 1 is therefore constructed to react to torsion stresses, by exploiting the deformability of the elastic intermediate ring 3.

With particular reference to FIGS. 1 and 2, said intermediate ring 3 comprises a groove 7 obtained along the edge of its end 3" opposite its stop collars 5.

When inserting the bushing 1 into the respective seat 100, the intermediate ring 3 elastically deforms and the space created by said groove 7 allows its free expansion.

For the same reason, said plastic outer ring 6 may comprise a plurality of openings 56 provided along the line connecting it to its stop collar 46; these openings receive the material of the deformed elastic ring 3, as shown in FIG. 3.

With particular reference to FIG. 4, said intermediate ring 3 is, instead, freely fitted onto said cylindrical tubular element 2.

In this embodiment, a reinforcing annular insert 9, of the appropriate thickness and made of material that does not yield radially, such as glass-reinforced nylon, is fixed to the inner cylindrical surface of the intermediate ring 3. The coupling between said intermediate ring 3 and said reinforcing annular insert 9 is advantageously achieved by means of vulcanization.

Also as illustrated in FIG. 4, said intermediate ring 3 comprises two grooves 7, 8 obtained therefrom respectively along both edges of its ends 6" 6'.

FIGS. 5 and 6 show a preferred embodiment of the intermediate ring 3 that, along the groove 7 obtained along its edge of the end 6", also comprises a plurality of dead holes 10, whose job is also to create spaces that can receive the ring material when it expands.

With particular reference to FIG. 7, a possible embodiment of the invention is shown, in which said reinforcing annular insert 9, on which the intermediate ring 3 in vulcanized, comprises along its inner surface a plurality of tooth-shaped slots 19, and said cylindrical tubular element 2 comprises corresponding teeth 21 adapted to cooperate by interference with said slots 19, so as to avoid mutual rotation of the parts.

FIGS. 8 and 9 show two pairs of bushings 1 mounted on a pin 200 before being forced into the assembly seat 100.

Assembly of the bushings 1 according to the invention is achieved by forcing the plastic outer rings 6 into the assembly seat 100.

As it is evident from FIG. 9, the coupling surfaces 26, 36 of the ring 6 facilitate and speed up insertion of the bushings.

During this operation, as illustrated in the section shown in FIG. 10, the outer side wall of these rings 6 is flattened against the inner surface of the assembly seat 100, becoming practically flat, while the inner side wall of the rings bulges and bends towards the axis of the bushings: the reinforcement 16 of the outer wall is transmitted, by means of the crushing deformation, to the inner wall, thereby causing the permanent compression of the elastic intermediate ring 3, with its free expansion in the grooves 7, 8 and in holes 10.

The bushings 1 are thereby fixed in their seat 100 by the friction present between the side walls of the plastic outer ring 6 and the inner surface of the assembly seat 100. The pin 200 is mounted free to rotate on the inner surface of the self-lubricating tubular elements 2.

During normal operation, the rubber intermediate rings 3 absorb bumps and radial stresses transmitted to the bushings 1 by the pin 200.

The possible presence of the reinforcing annular insert 9, of an appropriate thickness, gives the bushings the desired radial stiffness, limiting crushing and containing the longitudinal deformation of the rubber intermediate rings 3.

The invention claimed is:

1. An improved elastic bushing (1) comprising:
   a cylindrical tubular element (2) made of self-lubricating material,
   an intermediate ring (3) made of an elastically deformable material,
   wherein said tubular element (2) and said intermediate ring (3), at one end (2', 3') thereof, are respectively provided with stop collars (4, 5), and wherein said cylindrical tubular element (2) is fixed to said intermediate ring (3) by means of vulcanization
   characterized in that it further comprises an outer ring (6) made of plastic material adapted to deform, on assembly, to allow the bushing (1) to be forced into a respective assembly seat (100), wherein said outer ring (6) has along its side wall a reinforced annular section (16) and at least one gradual coupling surface (26) between said reinforced annular section (16) and the end (6") of said outer ring opposite said stop collars (4, 5), and
   wherein said intermediate ring (3) comprises a groove (7) made along the edge of the end (3") opposite said stop collars (4, 5).

2. The improved elastic bushing (1) according to claim 1, wherein said outer ring (6) comprises a stop collar at one end, and a plurality of openings (56) provided along a line around the outer circumference of the outer ring where it is connected to its stop collar (46).

3. An improved elastic bushing (1) comprising:
   a cylindrical tubular element (2) made of self-lubricating material,
   an intermediate ring (3) made of an elastically deformable material,
   wherein said tubular element (2) and said intermediate ring (3), at one end (2', 3') thereof, are respectively provided with stop collars (4, 5),
   characterized in that it further comprises an outer ring (6) made of plastic material adapted to deform, on assembly, to allow the bushing (1) to be forced into a respective assembly seat (100), wherein said outer ring (6) has along its side wall a reinforced annular section (16) and at least one gradual coupling surface (26) between said reinforced annular section (16) and the end (6") of said outer ring opposite said stop collars (4, 5),
   wherein said intermediate ring (3) is freely fitted onto said cylindrical tubular element (2) and interposed between these there is a reinforcing annular insert (9) made of material that does not yield radially, onto which said intermediate ring (3) is fitted by means of vulcanization, wherein said intermediate ring (3) comprises two grooves (7, 8) respectively obtained therefrom along the edges of its ends (3", 3'), and wherein said intermediate ring (3) comprises a plurality of dead holes (10) provided along the groove (7) obtained along the edge of the end (3") thereof opposite said stop collars (4, 5).

4. The improved elastic bushing (1) according to claim 3, wherein said outer ring (6) comprises a plurality of openings (56) provided along a line around the outer circumference of the outer ring where it is connected to its stop collar (46).

5. The improved elastic bushing (1) according to claim 3, wherein said reinforcing annular insert (9), along its inner surface, comprises a plurality of slots (19) and said cylindrical tubular element (2) comprises corresponding teeth (21) adapted to cooperate with said slots (19) so as to avoid mutual rotation.

\* \* \* \* \*